US010105873B2

(12) United States Patent
Lee et al.

(10) Patent No.: US 10,105,873 B2
(45) Date of Patent: Oct. 23, 2018

(54) MOLD FOR MANUFACTURING A FOOD PACKAGING MATERIAL HAVING UNIFORM COATING OF OIL

(71) Applicants: CJ CHEILJEDANG CORPORATION, Seoul (KR); KOREA ADVANCED INSTITUTE OF SCIENCE AND TECHNOLOGY, Daejeon (KR)

(72) Inventors: Jin Hwan Lee, Seoul (KR); Kyoung Sik Jo, Seoul (KR); Min Young Park, Seoul (KR); Sang Eon Lee, Daejeon (KR); Seung Seob Lee, Daejeon (KR)

(73) Assignees: CJ CHEILJEDANG CORPORATION, Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/384,733

(22) Filed: Dec. 20, 2016

(65) Prior Publication Data
US 2017/0101257 A1  Apr. 13, 2017

Related U.S. Application Data

(62) Division of application No. 14/344,215, filed as application No. PCT/KR2011/008064 on Oct. 27, 2011, now Pat. No. 9,555,956.

(30) Foreign Application Priority Data

Sep. 21, 2011 (KR) .......................... 10-2011-0095170

(51) Int. Cl.
*B29C 33/42* (2006.01)
*B29C 33/38* (2006.01)
(Continued)

(52) U.S. Cl.
CPC ............ *B29C 33/424* (2013.01); *B29C 33/38* (2013.01); *B29C 33/56* (2013.01); *B29K 2905/14* (2013.01); *B65D 65/42* (2013.01)

(58) Field of Classification Search
CPC ....... B29C 33/424; B29C 33/38; B29C 33/56; B29K 2905/14
See application file for complete search history.

(56) References Cited

U.S. PATENT DOCUMENTS 5,376,392 A   12/1994   Ikegami et al. .............. 426/127
5,603,997 A    2/1997   Lindgren et al. ............ 428/34.2
(Continued)

FOREIGN PATENT DOCUMENTS

CN        201816924 U       5/2011
DE    10 2007 020 655 A1   11/2008
(Continued)

OTHER PUBLICATIONS

International Search Report dated Nov. 1, 2012, issued in corresponding International Patent Application No. PCT/KR2011/008064.
(Continued)

*Primary Examiner* — Michael Safavi
(74) *Attorney, Agent, or Firm* — Stein IP, LLC

(57) ABSTRACT

The present invention relates to a food packaging material for packing food, more particularly to a food packaging material having a uniform coating of oil, a method of manufacturing the same, and a mold for manufacturing the same. The food packaging material includes a plurality of grooves formed on one surface of the food packaging material; and an oil layer uniformly applied to the one surface of the food packaging material, being put into the grooves. According to the present invention, there are provided a food packaging material which continuously main-
(Continued)

tains a uniform coating of oil and thus minimizes sticking of contents to a surface of the packaging material, a method of manufacturing the same, and a mold for manufacturing the same.

9 Claims, 5 Drawing Sheets

(51) Int. Cl.
    *B29C 33/56*     (2006.01)
    *B65D 65/42*     (2006.01)

(56) References Cited

U.S. PATENT DOCUMENTS

| | | | |
|---|---|---|---|
| 6,187,396 B1 | 2/2001 | Moller | 428/34.3 |
| 2005/0003146 A1 | 1/2005 | Spath | 428/105 |
| 2006/0279738 A1* | 12/2006 | Ogawa | G01N 21/554 356/445 |
| 2008/0299380 A1 | 12/2008 | Choi et al. | 428/315.7 |
| 2010/0173167 A1 | 7/2010 | Vissing et al. | 428/447 |
| 2010/0327485 A1 | 12/2010 | Maaninen et al. | 264/293 |
| 2011/0088567 A1 | 4/2011 | Deroulers | 99/426 |

FOREIGN PATENT DOCUMENTS

| | | |
|---|---|---|
| JP | 3-215031 A | 9/1991 |
| JP | 2010-242081 A | 10/2010 |
| KR | 200-0006584 A | 1/2000 |
| KR | 2000-0006584 A | 1/2000 |
| KR | 10-2004-0061492 A | 7/2004 |
| KR | 10-2004-0076150 A | 8/2004 |
| KR | 10-2006-0001849 A | 1/2006 |
| KR | 10-0556982 B1 | 3/2006 |

OTHER PUBLICATIONS

International Search Report dated Jun. 26, 2012, issued in corresponding International Application No. PCT/KR2011/006432.
Korean Office Action dated Feb. 18, 2013, issued to the corresponding Korean Application No. 2011-0072405.
European Extended Search Report dated Mar. 18, 2015, issued to the corresponding European Application No. 11869522.0.

\* cited by examiner

MOLD FOR MANUFACTURING A FOOD PACKAGING MATERIAL HAVING UNIFORM COATING OF OIL

CROSS-REFERENCE TO RELATED APPLICATIONS

This application is divisional application of U.S. application Ser. No. 14/344,215 filed Mar. 11, 2014, which is a national stage of International Application No. PCT/KR2011/008064, filed Oct. 27, 2011, which claims the benefit of Korean Application No. 10-2011-0095170, filed Sep. 21, 2011, in the Korean Intellectual Property Office. All disclosures of the document(s) named above are incorporated herein by reference.

BACKGROUND OF THE INVENTION

1. Field of the Invention

The present invention relates to a food packaging material for packing food, more particularly to a food packaging material having a uniform coating of oil, a method of manufacturing the same, and a mold for manufacturing the same.

2. Description of the Related Art

Food packaging materials are used to package food. Food packaging materials have been improved to enhance stability of food storage, whereas a problem that contents stick to a food packaging material is not solved.

For example, as to a food packaging material used as a top of a spoonable fermented milk product, when a consumer buys a fermented milk product and pulls the food packaging material, some contents stick to the food packaging material. In this case, consumers mostly give up the contents on the packaging material. The same problem occurs with respect to a food packaging material for packaging high-viscosity retort food, such as retort curry.

FIG. 1 illustrates a conventional food packaging material. In order to solve the above problem, there is a try at coating the surface of a food packaging material 10 with edible oil.

In this case, however, as shown in FIG. 1, force caused by surface extension of oil acts in arrow directions, so that the edible oil forms a plurality of agglomerated oil drops 20. When the edible oil is not uniformly applied, contents are not prevented from sticking to the packaging material.

SUMMARY OF THE INVENTION

Technical Problem

The present invention is directed to solve problems mentioned above and provides a food packaging material which continuously maintains a uniform coating of oil and thus minimizes sticking of contents to a surface of the packaging material, a method of manufacturing the same, and a mold for manufacturing the same.

Solution to Problem

In accordance with an aspect of the present invention, a method of manufacturing a food packaging material having a uniform coating of oil includes (a) preparing a mold including a plurality of prism bodies and (b) forming a plurality of grooves on one surface of a food packaging material corresponding to the prism bodies by pressing the mold to the food packaging material.

The method may further include (c) applying an oil layer to the one surface of the food packaging material on which the grooves are formed.

The preparing the mold (a) may include (a-1) preparing a first metal layer, (a-2) depositing a photoresist layer on the first metal layer, (a-3) forming a plurality of photoresist holes disposed at predetermined intervals by patterning the photoresist layer, and (a-4) forming the prism bodies on the first metal layer.

The photoresist holes may have a cylindrical shape or a polygonal prism shape and are arranged in a grid pattern.

The prism bodies may be formed on the first metal layer by galvanoplasty.

The prism bodies may be formed on the first metal layer disposed in the photoresist holes.

The first metal layer may be deposited on a silicon layer disposed under the first metal layer.

The first metal layer may include titanium.

The prism bodies may include nickel or gold.

In accordance with another aspect of the present invention, a mold for manufacturing a food packaging material having a uniform coating of oil includes a first metal layer, a photoresist layer formed on the first metal layer and including a plurality of photoresist holes disposed at predetermined intervals, and a plurality of prism bodies formed on the first metal layer disposed in the photoresist holes.

The prism bodies may have a cylindrical shape or a polygonal prism shape and are arranged in a grid pattern.

The first metal layer may be deposited on a silicon layer disposed under the first metal layer.

The first metal layer may include titanium.

The prism bodies may include nickel or gold.

In accordance with still another aspect of the present invention, a food packaging material having a uniform coating of oil to package food includes a plurality of grooves formed on one surface of the food packaging material and an oil layer uniformly applied to the one surface of the food packaging material, being put into the grooves.

The grooves may be arranged at predetermined intervals in a grid pattern.

The grooves may have a cylindrical shape or a polygonal prism shape.

Advantageous Effects of Invention

As described above, the present invention provides a food packaging material which continuously maintains a uniform coating of oil and thus minimizes sticking of contents to a surface of the packaging material, a method of manufacturing the same, and a mold for manufacturing the same.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
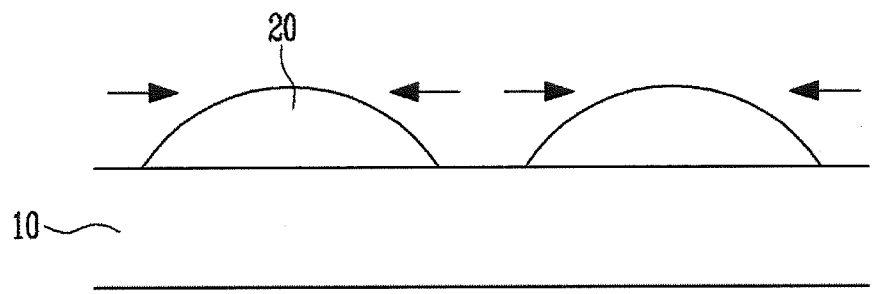
FIG. 1 illustrates a conventional food packaging material.

Reference will now be made in detail to exemplary embodiments of the present invention, examples of which are illustrated in the accompanying drawings. The embodiments are described below in order to explain the present invention by referring to the figures. This invention may, however, be embodied in many different forms and should not be construed as limited to the exemplary embodiments set forth herein.

Rather, these embodiments are provided so that this disclosure will be thorough and complete, and will fully convey the scope of the invention to those skilled in the art. Description of unnecessary parts or elements may be omitted for clarity and conciseness, and like reference numerals in the drawings refer to like elements.

Hereinafter, a food packaging material having a uniform coating of oil, a method of manufacturing the same, and a mold for manufacturing the same according to exemplary embodiments of the present invention will be described with reference to the accompanying drawings.

Figure 2A:
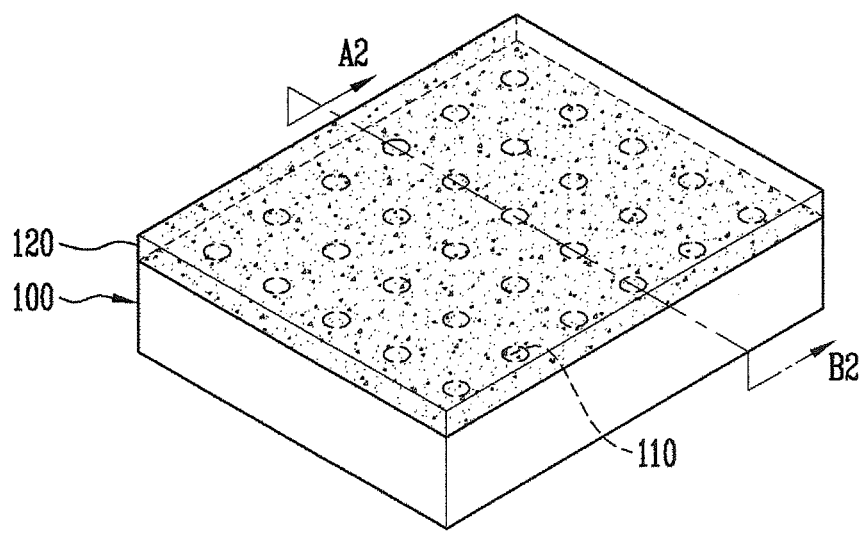
FIG. 2a is a perspective view of a food packaging material having a uniform coating of oil according to an exemplary embodiment of the present invention.
Figure 2B:
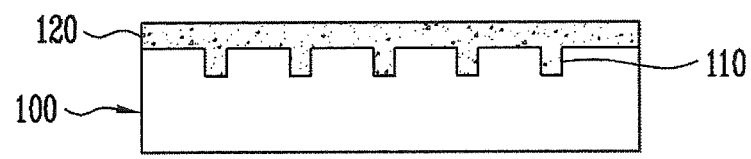
FIG. 2b is a cross-sectional view of the food packaging material of FIG. 2, taken along line A2-B2.

FIG. 2a is a perspective view of a food packaging material having a uniform coating of oil according to an exemplary embodiment of the present invention, and FIG. 2b is a cross-sectional view of the food packaging material of FIG. 2, taken along line A2-B2.

Referring to FIGS. 2a and 2b, the food packaging material having the uniform coating of oil (hereinafter, "food packaging material") 100 according to the exemplary embodiment of the present invention is used to package food, for example, used as a top for a fermented milk product or a packaging material for retort food. The food packaging material 100 includes a plurality of grooves 110 which are formed on one side thereof for a uniform coating of oil and an oil layer 120.

The grooves 110 may be formed in a minute size by microelectromechanical systems (MEMS), which will be described in detail.

The oil layer 120 is applied to a surface of the food packaging material 100 having the grooves 110 in order to prevent food from sticking to the surface of the food packaging material 100.

In particular, the oil layer 120 is put into the respective grooves 110 to relieve force due to surface tension of oil, described with reference to FIG. 1, and thus the oil layer 120 is not separately dispersed as agglomerated oil drops but is uniformed applied.

Further, as compared with the packaging material of FIG. 1, a coating of the oil layer 120 is stably maintained for a long time, and the oil layer 120 in the grooves 110 functions to push water or food, so that the food does not stick to the packaging material. Accordingly, a minimum amount of food sticks to the packaging material.

Also, the uniformly applied oil layer 120 prevents the food packaging material 100 from being in direct contact with food, thereby avoiding harmful effects transmitted from the food packaging 100.

Here, the grooves 101 may be arranged at predetermined intervals in a grid pattern in order to uniformly form the oil layer 120, shown in FIG. 2a.

Further, the grooves 110 may have a cylindrical shape or various polygonal prism shapes, such as a triangular prism, a rectangular prism, a hexagonal prism, etc., and may have the same height.

FIGS. 3a to 3d illustrate a method of manufacturing the food packaging material of FIG. 2a.

Referring to FIGS. 3a to 3d, the method of manufacturing the food packaging material according to the present embodiment includes (a) preparing a mold and (b) forming grooves, and may further include (c) applying an oil layer.

Figure 3A:
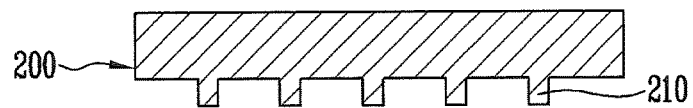
FIGS. 3a to 3d illustrate a method of manufacturing the food packaging material of FIG. 2.
Figure 3A:

Referring to FIG. 3a, in the preparing the mold (a), a mold 200 having a plurality of prism bodies 210 and a food packaging material 100 are prepared.

Here, the grooves 110 are not yet formed in the food packaging material 100, which is formed of synthetic resins, such as polypropylene (PP) and polyethylene terephthalate (PET).

Further, the prism bodies 210 are provided to form the grooves 110 and formed in a corresponding shape to the grooves 110. Thus, the prism bodies 210 may have a cylindrical or polygonal prism shape and be arranged in a grid pattern.

Figure 3B:
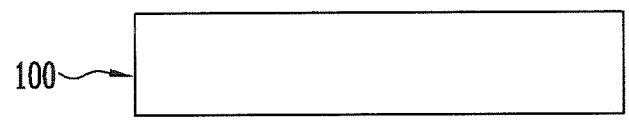
Figure 3B:
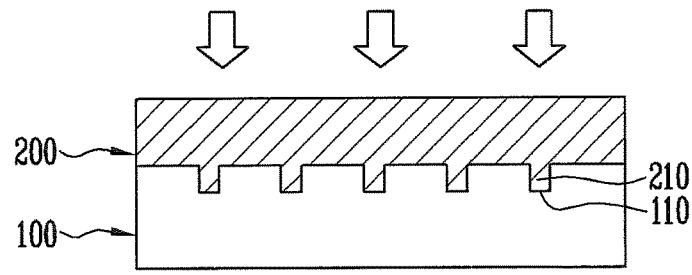

Referring to FIG. 3b, in the forming the grooves (b), the food packaging material 100 and the mold 200 are arranged, and then the mold 200 is pressed to the food packaging material 100, thereby forming a plurality of grooves 110 on one surface of the food packaging material 100 corresponding to the prism bodies 210.

That is, when the mold 200 is joined to the food packaging material 100 using heat and pressure, parts of the food packaging material 100 corresponding to the prism bodies 210 are pressed by the prism bodies 210, thereby forming the grooves 110.

These grooves 110 are formed based on a shape of the prism bodies 210. Thus, when the prism bodies 210 have a cylindrical shape, the grooves 110 are formed in a cylindrical shape. When the prism bodies 210 have a polygonal prism shape, the grooves 110 are formed in a polygonal prism shape.

Figure 3C:
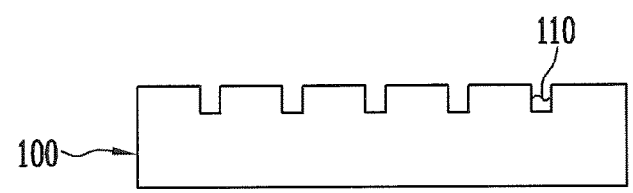
Figure 3D:
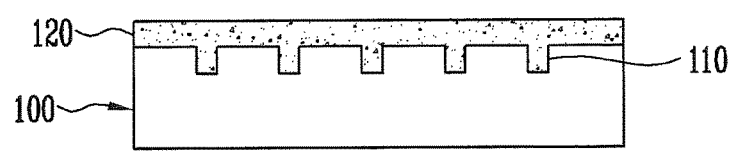

Referring to FIGS. 3c and 3d, in the applying the oil layer (c), the mold 200 bonded to the food packaging material 100 is removed, and then the oil layer 120 is applied to the one surface of the food packaging material 100 on which the grooves 110 are formed.

FIGS. 4a to 7b illustrate a process of manufacturing a mold used in a method of manufacturing a food packaging material. With reference to FIGS. 4a to 7b, the method of manufacturing the food packaging material is described in detail.

According to an exemplary embodiment of the present invention, (a) preparing a mold includes (a-1) preparing a first metal layer, (a-2) depositing a photoresist layer, (a-3) forming photoresist holes, and (a-4) forming prism bodies.

Figure 4A:
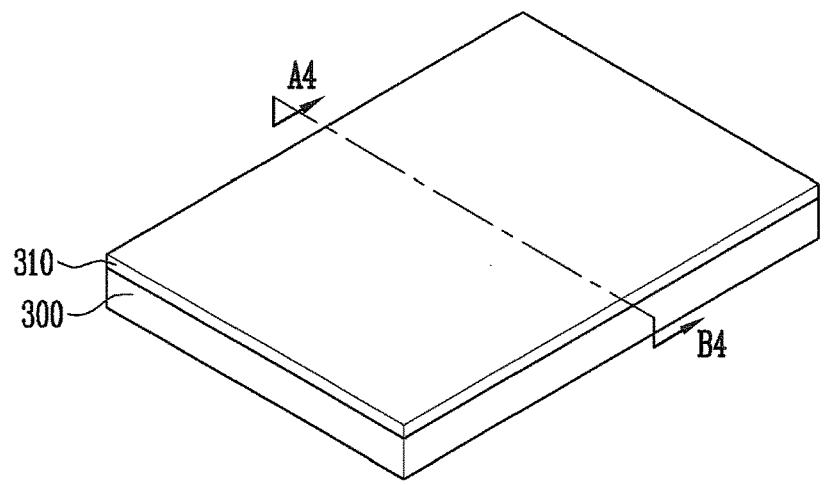
FIGS. 4a to 7b illustrate a process of manufacturing a mold used in a method of manufacturing a food packaging material.
Figure 4B:
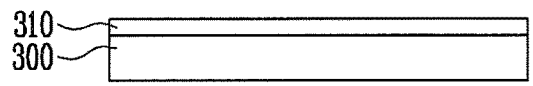

FIG. 4a illustrates the preparing the first metal layer (a-1), and FIG. 4b is a cross-sectional view of FIG. 4a, taken along line A4-B4.

Referring to FIGS. 4a and 4b, in the preparing the first metal layer (a-1), a silicon layer 300 is prepared, and a first metal 310 is formed on the silicon layer 300.

Here, The first metal layer 310 may be formed on a silicon layer 300 in order to uniformly form the first metal layer 310.

Further, the first metal layer 310 may include titanium and may also include other metals.

Figure 5A:
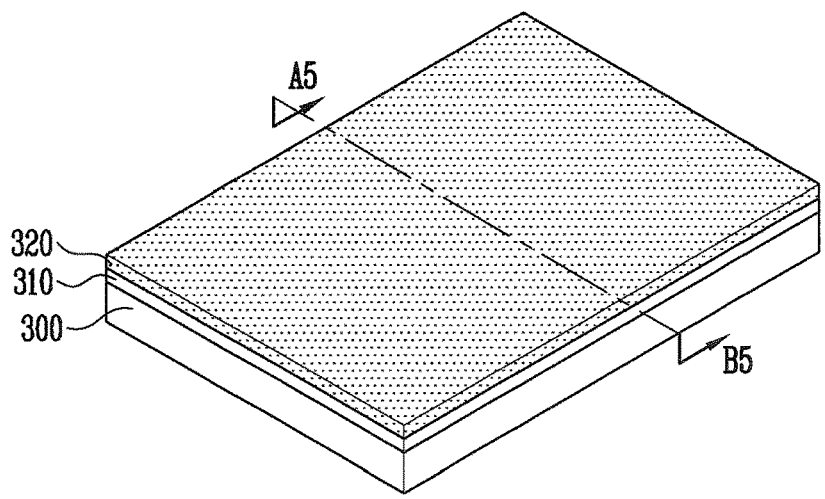
Figure 5B:
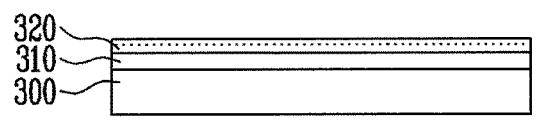

FIG. 5a illustrates the depositing the photoresist layer (a-2), and FIG. 5b is a cross-sectional view of FIG. 5a, taken along line A5-B5.

Referring to FIGS. 5a and 5b, in the depositing the photoresist layer (a-2), a photoresist layer 320 is deposited on the first metal layer 310.

Here, the photoresist layer 320 may include a positive photoresist or a negative photoresist. For example, AZ9260 may be used as a positive photoresist, and SU-8 may be used as a negative photoresist.

Figure 6A:
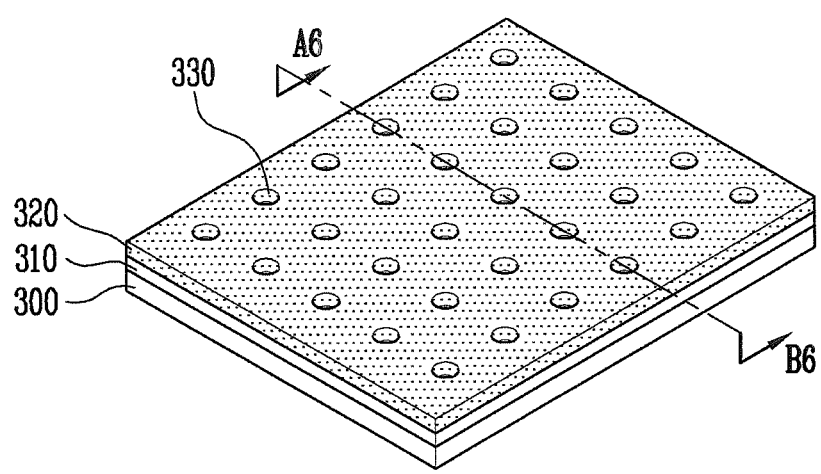
Figure 6B:
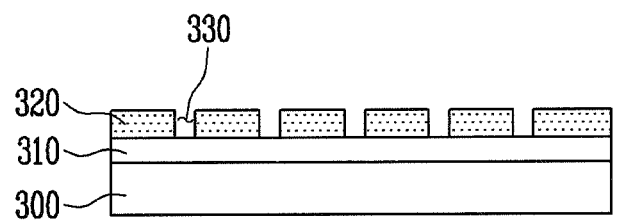

FIG. 6a illustrates the forming the photoresist holes (a-3), and FIG. 6b is a cross-sectional view of FIG. 6a, taken along line A6-B6.

Referring to FIGS. 6a and 6b, in the forming the photoresist holes (a-3), the photoresist layer 320 deposited on the first metal layer 310 is patterned. Thus, a plurality of photoresist holes 330 disposed at predetermined intervals are formed in the photoresist layer 320.

That is, the photoresist holes 330 may be formed in the photoresist layer 320 by exposing and developing processes of photolithography.

Here, the photoresist holes 330 may have a cylindrical shape or a polygonal prism shape and be arranged in a grid pattern. The first metal layer 310 under the photoresist holes 330 is exposed to the outside.

Figure 7A:
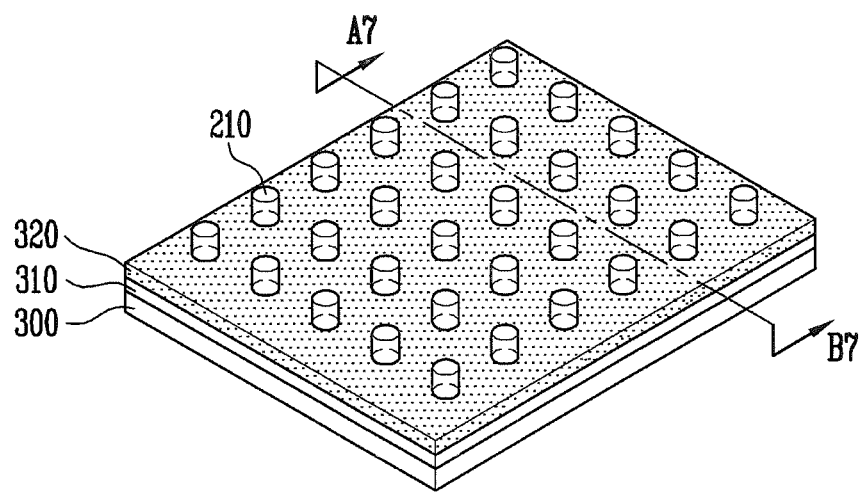
Figure 7B:
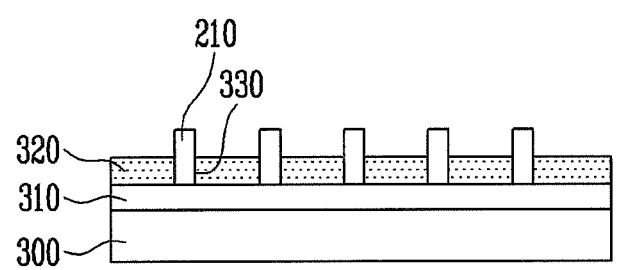

FIG. 7a illustrates the forming the prism bodies (a-4), and FIG. 7b is a cross-sectional view of FIG. 7a, taken along line A7-B7.

Referring to FIGS. 7a and 7b, in the forming the prism bodies (a-4), prism bodies 210 are formed in the photoresist holes 330. As the first metal layer 310 is exposed to the outside through the photoresist holes 330, the prism bodies 210 are formed on the first metal layer 310. Thus, the mold 200 including the prism bodies 210 is completely formed.

Here, the prism bodies 210 may be formed by galvanoplasty. Thus, the prism bodies 210 may be formed on the first metal layer 310 and disposed in the photoresist holes 300.

In this case, since the photoresist layer 320 is nonconductive, the prism bodies 210 of a metal material grows only on the first metal layer 310 having conductivity.

To this end, the prism bodies 210 may be formed of nickel (Ni) or gold (Au) or may also include other metals.

Using MEMS, a plurality of prism bodies 210 having a considerably minute size may be formed on the mold 200, and accordingly the food packaging material 100 may also be formed with considerably minute grooves 110.

The mold 200 to manufacture the food packaging material according to the embodiment of the present invention may be manufactured by the above described process, and thus the mold 200 includes the first metal layer 310, the photoresist layer 320, and the prism bodies 210 (see FIGS. 7a and 7b).

The first metal layer 310 may be formed on a silicon layer 300, and the photoresist layer 320 having the plurality of photoresist holes 330 is disposed on the first metal layer 310.

The prism bodies 210 are formed on the first metal layer 310 disposed in the photoresist holes 330 to be exposed to the outside.

The mold 200 thus manufactured facilitates formation of the minute grooves 110 in the food packaging material 100, so that each food packaging material 100 is not involved in a complicated process including photolithography. Thus, costs, time, and labor force involved in manufacture may be reduced.

Although the spirit of the present invention was described in detail with reference to the preferred embodiments, it should be understood that the embodiments are provided only for explaining the present invention and the present invention is not limited thereto. Further, it should be understood that the present invention may be modified in various ways by those skilled in the art, without departing from the scope of the present invention. The scope of the present invention described above is determined by the following claims and not limited to the detailed description described herein, and equivalent changes and modifications within claims are included in the spirit and scope of the present invention.

What is claimed is:

1. A mold for manufacturing a food packaging material having a uniform coating of oil, the mold comprising:
    a first metal layer;
    a photoresist layer formed on the first metal layer and including a plurality of photoresist holes disposed at predetermined intervals; and
    a plurality of prism bodies formed on the first metal layer, each including a first portion disposed in the photoresist holes and a second portion protruding from an upper surface of the photoresist layer,
    wherein the first portion and the second portion have substantially the same width.

2. The mold of claim 1, wherein the prism bodies have a cylindrical shape or a polygonal prism shape and are arranged in a grid pattern.

3. The mold of claim 1, wherein the first metal layer is deposited on a silicon layer disposed under the first metal layer.

4. The mold of claim 1, wherein the first metal layer comprises titanium.

5. The mold of claim 1, wherein the prism bodies comprise nickel or gold.

6. The mold of claim 1, wherein the prism bodies comprise nickel.

7. The mold of claim 1, wherein the prism bodies are formed by galvanoplasty.

8. A mold, comprising:
    a titanium layer;
    a photoresist layer formed on the titanium layer and including holes; and
    nickel bodies formed on the titanium layer, each including a first portion disposed in the photoresist holes and a second portion protruding from an upper surface of the photoresist layer,
    wherein the first portion and the second portion have substantially the same width, and the mold is used for manufacturing a food packaging material.

9. The mold of claim 8, wherein the prism bodies are formed by galvanoplasty.

* * * * *